April 17, 1945.  G. STEVEN  2,374,142
SIGHT GLASS ASSEMBLY
Filed March 17, 1944
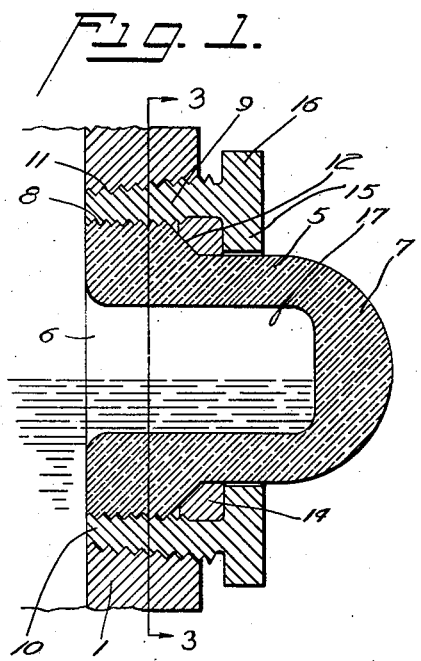
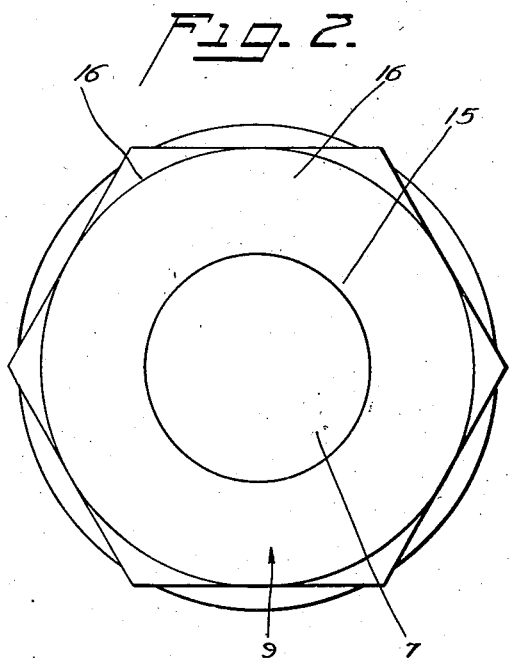
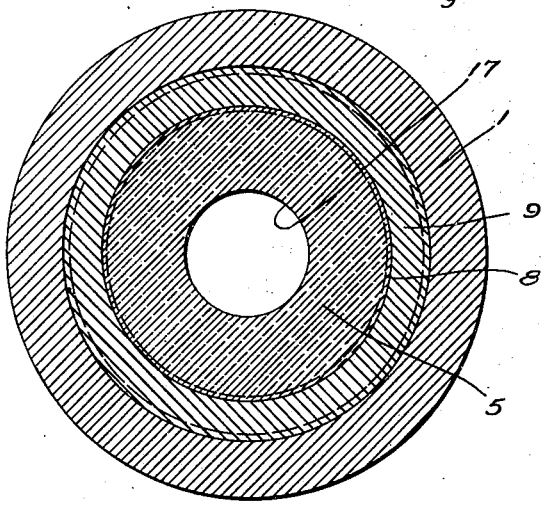
George Steven
INVENTOR
BY
ATTORNEY Patented Apr. 17, 1945

2,374,142

UNITED STATES PATENT OFFICE 2,374,142

SIGHT GLASS ASSEMBLY

George Steven, Buffalo, N. Y., assignor to Worthington Pump and Machinery Corporation, Harrison, N. J., a corporation of Delaware Application March 17, 1944, Serial No. 526,995

2 Claims. (Cl. 73—334)

This invention relates to sight glasses, and more particularly to a sight glass for use in connection with the crank cases of various types of machinery such as compressors, engines, or the like wherein a quantity of oil or other liquid is maintained in the crank case of the machine.

It is the present day practice to employ flat bull's-eye sight glasses or sight glasses having substantially flat vision surface which are in some instances shrouded with shades to prevent high lights but such types are difficult to see through because of light conditions, particularly in the crank case, and often it is necessary to use two of such sight glasses on opposite sides of the crank case so that light will shine through to render the liquid level in the crank case visible.

An object of the present invention is to provide a sight glass by means of which the liquid level in a crank case may be quickly and easily determined at any time from practically any sight angle, and one which is very unlikely to be obstructed from any direction so that observation of the liquid level should be possible in any installation of the machine with which the improved sight glass is used.

With these and other objects in view, as may appear from the accompanying specification, the invention consists of various features of construction and combination of parts, which will be first described in connection with the accompanying drawing, showing an improvement in sight glass assembly of a preferred form embodying the invention, and the features forming the invention will be specifically pointed out in the claims.

In the drawing:

Figure 1 is a longitudinal section through the improved sight glass.

Figure 2 is an end view of the improved sight glass.

Figure 3 is a cross section taken on the line 3—3 of Figure 1.

Refering more particularly to the drawing, the improved sight glass is shown in Figure 1 as attached to a wall part of the crank case 1 of any suitable type of machine such as a compressor, engine, or the like in which a quantity of liquid is maintained in the crank case for lubricating or other purposes.

The sight glass proper comprises a substantially cylindrical transparent body 5 which has its inner end open as shown at 6, and its outer end closed so as to present a convexly curved surface outwardly, resulting in a sight glass which is substantially U shaped in longitudinal section. The inner end of the body 5 is thickened, and this thickened end is preferably screw threaded as shown at 8 for detachable connection with the attaching member 9. The attaching member 9 comprises a cylindrical body 10 threaded on its outer surface for threadable engagement with the threaded walls of the opening 11 in the wall part of the crank case 1 and on its inner surface for engagement with the threaded portion of the thickened inner end of the body 5 of the sight glass. The thickened portion of the inner end of the body 5 of the sight glass merges into the normal outer surface of the body by an annular inclined surface 12 against which a sealing washer 14 engages. The sealing washer 14 is clamped in fluid-tight sealing engagement with the inclined annular surface 12 by the inwardly extending annular flange 15 formed upon the hexagonal head 16 of the attaching member 9.

The sight glass structure is connected to the crank case 1 in such manner that the open end 6 will open into the crank case and permit a portion of the liquid in the crank case to flow into the hollow 17 of the transparent body 5, and consequently be visible through the outwardly projecting portion of the sight glass. As clearly shown in Figure 1 of the drawing, the sight glass projects outwardly of the crank case 1 and also outwardly beyond the outermost surface of the attaching member 9, leaving a substantial portion of the sight glass exposed either from above, below, or at various angles outwardly of the sight glass, and thus the level of liquid in the sight glass and consequently in the crank case may be observed from practically any sight angle exteriorly of the crank case.

It will be understood that the invention is not to be limited to the specific construction or arrangement of parts shown, but that they may be widely modified within the invention defined by the claims.

What is claimed is:

1. In a liquid-containing vessel having a wall provided with a threaded opening, a liquid level indicating body of transparent material, said body being of hollow contour and having an open end extending into said opening for communication with the interior of the vessel to cause liquid to flow into the body, the hollow contour of said body projecting beyond the outer face of the wall, said body being provided with exterior threads adjacent said open end, and an annular member interposed between said body and the face of said opening and having external threads and internal threads for respectively engaging the threads in said opening and on said body to fixedly connect the latter with the wall.

2. As a new article of manufacture, a sight glass assembly for indicating the liquid level in a crank case having a threaded opening, said sight glass assembly comprising a body of transparent material, said body being of hollow contour and having an annular open end extending into said threaded opening for communication with the interior of the crank case to cause liquid to flow into the body, the hollow contour of said body projecting outwardly beyond the outer face of the crank case, the annular end of said body being provided with exterior threads and having an annular shoulder adjacent the threads on the body, an annular member threaded into said threaded opening and onto the threads on said body for fixedly securing the latter to the crank case, said annular member having an annular flange spaced axially from said annular shoulder, and a seal interposed between said annular shoulder and the annular flange.

GEORGE STEVEN.